(12) United States Patent
Alexander

(10) Patent No.: US 7,963,352 B2
(45) Date of Patent: Jun. 21, 2011

(54) POWERED UNICYCLE

(75) Inventor: Keith Vivian Alexander, Christchurch (NZ)

(73) Assignee: Engineering Recreation (2008) Limited, Riccarton, Christchurch (NZ)

( * ) Notice: Subject to any disclaimer, the term of this patent is extended or adjusted under 35 U.S.C. 154(b) by 1200 days.

(21) Appl. No.: 10/569,152

(22) PCT Filed: Aug. 18, 2004

(86) PCT No.: PCT/NZ2004/000188
§ 371 (c)(1),
(2), (4) Date: Jan. 8, 2007

(87) PCT Pub. No.: WO2005/016735
PCT Pub. Date: Feb. 24, 2005

(65) Prior Publication Data
US 2007/0158117 A1    Jul. 12, 2007

(30) Foreign Application Priority Data
Aug. 18, 2003    (CS) .......................... 527651

(51) Int. Cl.
*B62D 61/08* (2006.01)
(52) U.S. Cl. ........................................ 180/21
(58) Field of Classification Search .......... 180/21; 280/47.3, 205
See application file for complete search history.

(56) References Cited

U.S. PATENT DOCUMENTS

| | | | | |
|---|---|---|---|---|
| 660,835 | A * | 10/1900 | Boes | 280/205 |
| 734,109 | A * | 7/1903 | Tolcher | 280/205 |
| 1,585,258 | A * | 5/1926 | Moore | 280/205 |
| 2,802,300 | A * | 8/1957 | Rogers | 446/234 |
| 2,971,773 | A * | 2/1961 | McKissick | 280/205 |
| 3,083,036 | A * | 3/1963 | Cornell, III et al. | 280/205 |
| 3,260,324 | A * | 7/1966 | Suarez | 180/10 |
| 3,399,742 | A | 9/1968 | Malick | |
| 4,062,558 | A * | 12/1977 | Wasserman | 280/205 |
| 4,109,741 | A * | 8/1978 | Gabriel | 180/21 |
| 4,241,931 | A * | 12/1980 | Healy | 280/205 |
| 5,002,931 | A * | 3/1991 | Rivier et al. | 514/11.2 |
| 6,302,230 | B1 | 10/2001 | Kamen et al. | |
| 6,367,817 | B1 * | 4/2002 | Kamen et al. | 280/5.507 |
| 6,561,294 | B1 * | 5/2003 | Kamen et al. | 180/21 |
| 6,651,766 | B2 | 11/2003 | Kamen et al. | |
| 2001/0032743 | A1 | 10/2001 | Kamen et al. | |
| 2002/0063006 | A1 | 5/2002 | Kamen et al. | |

FOREIGN PATENT DOCUMENTS

| | | |
|---|---|---|
| EP | 1174334 | 1/2002 |
| GB | 2282355 | 1/1995 |
| WO | 0115962 | 3/2001 |

OTHER PUBLICATIONS

B. MacLennan, The Electric Unicycle, http://t1b.org/eunicycle.html.

* cited by examiner

*Primary Examiner* — Paul N Dickson
*Assistant Examiner* — Robert A Coker
(74) *Attorney, Agent, or Firm* — Dann, Dorfman, Herrell and Skillman, P.C.

(57) ABSTRACT

A powered unicycle (100) having a wheel (105) driven by a motor (107) and a control system arranged to automatically maintain the fore-aft balance of the unicycle (100) via operation of the motor (107). The unicycle (100) also includes a handle bar (102), coupled to the wheel (105) by a pillar (101), which is operable to steer the wheel (105), and a rider-support (109) which is pivotable relative to the wheel.

20 Claims, 9 Drawing Sheets

POWERED UNICYCLE

FIELD OF THE INVENTION

The present invention relates to a powered unicycle.

BACKGROUND TO THE INVENTION

Pedal-operated unicycles typically have a seat upon which a rider may sit and operate pedals coupled to the wheel to propel the unicycle. Riders of pedal-operated unicycles must maintain stability by managing both their lateral balance and fore-aft balance while traveling straight and turning. Fore-aft balance on a pedal-operated unicycle is managed by speeding the wheel up or slowing the wheel down in order to maintain the wheel point-of-contact under the center of mass of the rider. Steering of the unicycle is typically accomplished by body twisting, as shown in FIG. 1, which involves the rider applying a steering couple c & c' to the wheel in the desired direction via their feet on the pedals and rotating their upper body in the opposite direction in order to react the steering couple c & c' with a reacting moment R. This is not an intuitive skill and can be uncomfortable to implement.

Powered unicycles, propelled by a motor coupled to the wheel, have been proposed in U.S. Pat. No. 6,302,230.

It is an object of the present invention to provide an improved powered unicycle, or to at least provide the public with a useful choice.

SUMMARY OF THE INVENTION

In one aspect, the present invention broadly consists in a powered unicycle including: a wheel driven by a motor; a control system arranged to automatically maintain the fore-aft balance of the unicycle via operation of the motor; a handlebar, coupled to the wheel by a pillar, which is operable to steer the wheel; and a rider-support which supports a rider, and which is pivotable relative to the wheel.

In one form, the rider-support is mounted to the pillar by a pivotal connection. Preferably, the pivotal connection is configured to resiliently urge the rider-support toward a central position relative to the wheel. More preferably, the pivotal connection includes a bush formed from resilient material located about a lower portion of the pillar and a sleeve coupled to the rider-support which surrounds the bush. Alternatively, the pivotal connection includes a spring mechanism arranged to urge the rider-support toward a central position relative to the wheel. Preferably, the spring mechanism includes two arms fixed relative to either the pillar or the rider-support and against which springs operate to urge the rider-support toward said central position.

Preferably, the rider-support is a standing platform upon which the rider may stand. Alternatively, the rider-support includes a seat upon which the rider may sit. Preferably, the rider-support fiber includes a foot platform upon which the rider may place their feet while sitting on the seat. In an alternative form, the rider-support is a seat, mounted to the pillar by a seat post, the seat being pivotal upon the seat post.

In another form, the unicycle includes two rider-supports, each being a foot pad pivotally mounted on a standing platform which is rigidly mounted to the pillar. Preferably, the foot pads are biased toward a central position relative to the wheel.

Preferably, the control system has one or more associated sensors arranged to detect whether the pillar and wheel are aligned with the local gravitational and inertial force field. More preferably, the control system is arranged to operate the motor to accelerate the wheel when it is detected as behind the field and to decelerate the wheel when it is detected as ahead of the field, to automatically maintain the fore-aft balance of the unicycle.

In another aspect, the present invention broadly consists in a powered unicycle including: a wheel driven by a motor; a control system arranged to automatically maintain the fore-aft balance of the unicycle via operation of the motor; a handlebar, coupled to the wheel by a pillar, which is operable to steer the wheel; and a standing platform, upon which a rider may stand, which is pivotable relative to the wheel.

Preferably, the standing platform is mounted to the pillar by a pivotal connection. More preferably, the pivotal connection is configured to resiliently urge the standing platform toward a central position relative to the wheel. Alternatively, the pivotal connection includes a spring mechanism arranged to urge the standing platform toward a central position relative to the wheel.

In another aspect, the present invention broadly consists in a powered unicycle including: a wheel driven by a motor; a control system arranged to automatically maintain the fore-aft balance of the unicycle via operation of the motor; a handlebar, coupled to the wheel by a pillar, which is operable to steer the wheel; a platform fixed to the pillar; and two foot pads pivotally mounted to the platform upon which the rider may stand.

Preferably, the foot pads are biased toward a central position relative to the wheel.

In this specification and accompanying claims the term "handlebar" is intended to include straight, circular, semi-circular, or any other formed shapes which may be handled by a rider and operated to steer the wheel of the unicycle. Also, the term "pillar" is intended to include any member or members, whether straight, bent or otherwise shaped, which may couple the handlebar to the wheel of the unicycle.

An advantage of the unicycles of the invention is that they do not require the rider to maintain lateral balance by steering using body twisting similar to that shown in FIG. 1, which is a difficult skill. Rather, the rider may simply steer the wheel via operation of the handlebar to maintain lateral balance.

BRIEF DESCRIPTION OF THE DRAWINGS

Preferred forms of the invention will be described by way of example only and with reference to the drawings, in which.

DETAILED DESCRIPTION OF PREFERRED EMBODIMENTS

Figure 2:
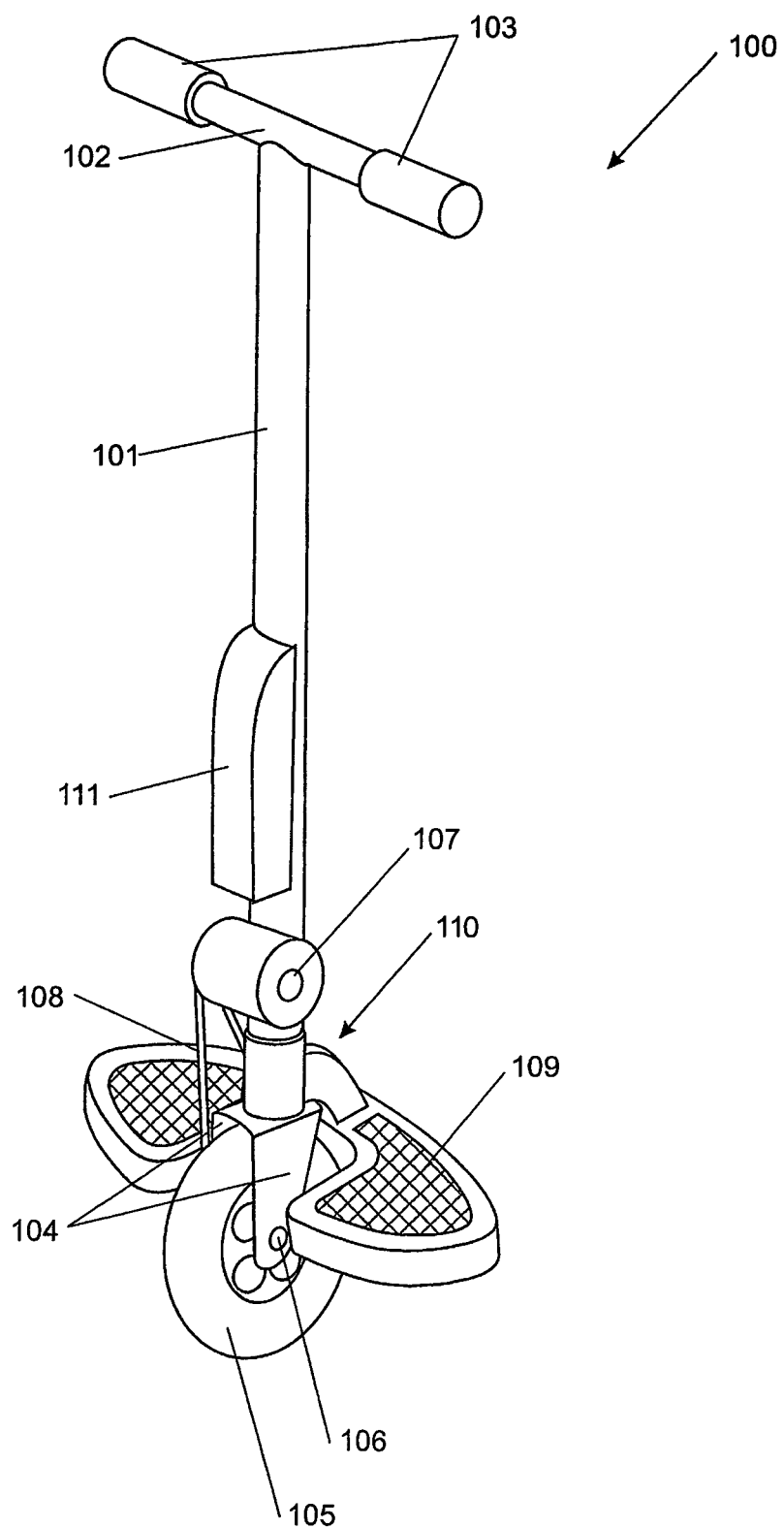
FIG. 2 shows a perspective view of a first preferred form powered unicycle, with a pivotable standing platform.

The powered unicycle automatically maintains fore-aft balance while a rider steers the unicycle to maintain lateral balance. Referring to FIG. 2, the first preferred form powered unicycle 100 includes a pillar 101 having at one end a handlebar 102 with handgrips 103 and at the other end a pair of forks 104 coupled to a single rotatable wheel 105. The wheel 105 has a shaft 106 which is rotatably mounted to the forks 104 and is driven by a motor 107 coupled to the shaft 106 by a belt 108. A rider-support, such as a standing platform 109, configured to support a rider is mounted via a pivotal connection 110 to the pillar 101 above the forks 104.

In the preferred form, the motor 107 is electric and is mounted to the pillar 101 above the standing platform 109. The electric motor 107 is operated by an electronic control system and the control system and electric motor 107 are preferably powered by a rechargeable battery. In the preferred form, the control system and battery are contained in a unit 111 mounted on the pillar 101 and are appropriately wired to the electric motor 107.

It will be appreciated that in alternative forms of the unicycle a belt 108 may not be required, for example the drive shaft of the electric motor 107 may be directly coupled to the shaft 106 of the wheel 105 or coupled via intermediate gears. Further, other motors such as a small internal combustion motor may be utilised to drive the wheel in alternative forms of the unicycle.

In operation, the control system automatically maintains the fore-aft balance for the rider of the unicycle by detecting, via one or more electronic sensors such as gyros, accelerometers or the like, whether the pillar 101, or some other datum line, is aligned with the local gravitational and inertial force field. If the wheel 105 is behind the field, the control system accelerates the wheel 105, via operation of the electric motor 107, to catch up. If the wheel 105 is ahead of the field, the control system decelerates the wheel 105 to allow the rider and unicycle mass to catch up with the wheel 105. Effectively, the control system, with its associated sensors, monitors whether the center of mass of the rider and unicycle is ahead or behind the wheel point-of-contact with the ground and accelerates or decelerates the wheel via operation of the motor in order to maintain the center of mass of the rider and unicycle directly above the wheel point-of-contact. With such a control system, the rider may accelerate by simply pushing the handlebar 102 forward or slow down and stop by pulling the handlebar 102 back.

Figure 3:
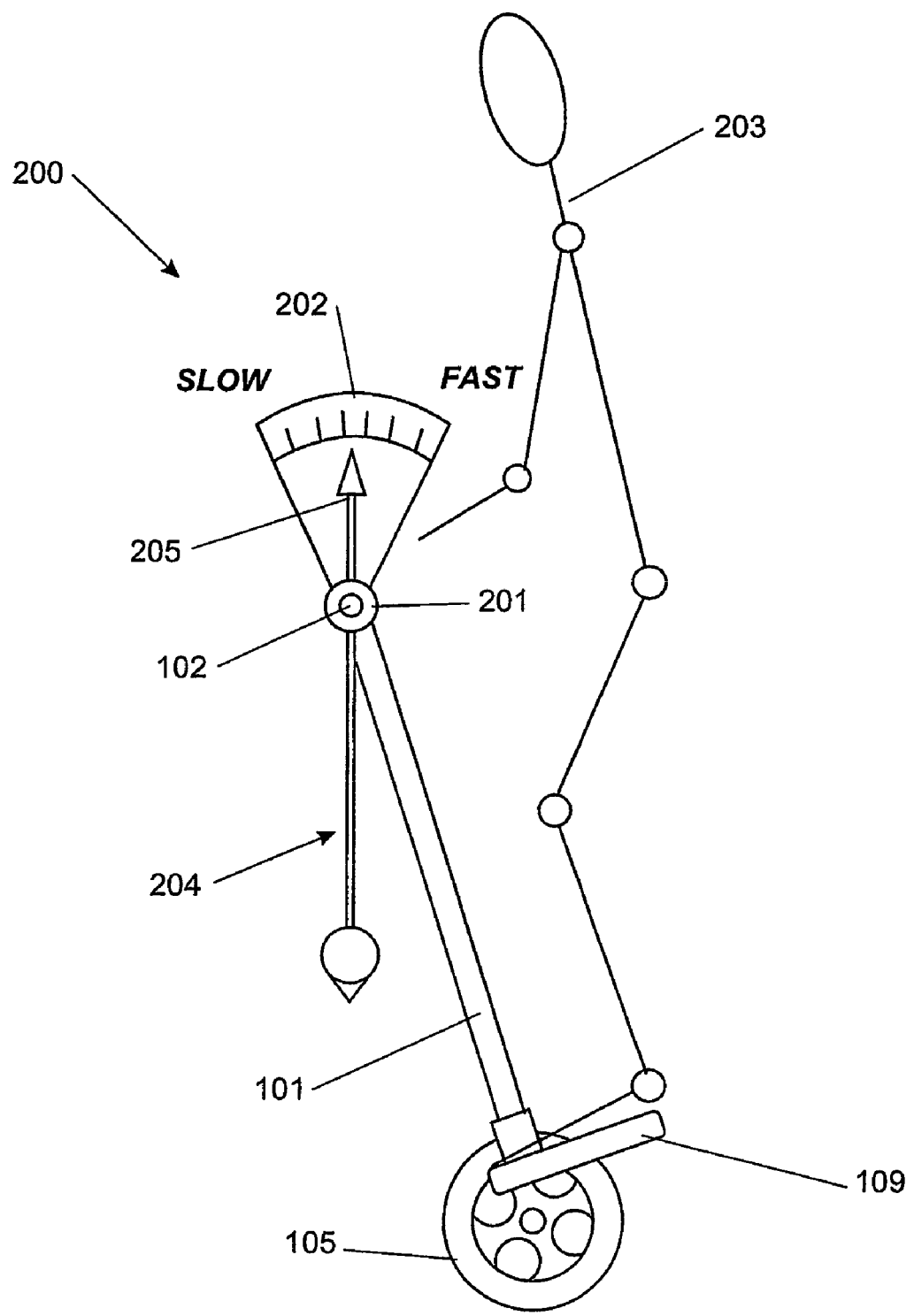
FIG. 3 is a side view of a pendulum-based control system for automatically maintaining fore-aft balance.

It will be appreciated that automatic fore-aft balance may be achieved by various other control systems with one or more associated sensors. Referring to FIG. 3, a simplified fore-aft control system 200 is shown, although for clarity the electric motor 107 driving the wheel 105 is not shown. The control system 200 includes a speed control knob 201, or alternatively a lever or the like, which is operable by the rider 203 to control the electric motor 107 speed and thereby the speed of the unicycle. As shown, the control knob 201 is preferably mounted on the handlebar 102, although this is not a requirement. A "fast-slow" speed dial 202 associated with the control knob 201 may also be fixed to the handlebar 102 for the rider's 203 assistance. A mechanical sensor, such as a rigid pendulum 204, is fixed to the control knob 201 and hangs below it. The pendulum 204 has a pointer portion 205 which indicates the speed of the unicycle on the speed dial 202.

Before using the unicycle, equipped with control system 200, the angle between the control knob 201, with pendulum 204 attached, and the speed dial 202 is set so that the electric motor runs at a constant speed with the rider 203 comfortably balanced on the unicycle. Assuming the unicycle, with rider 203, is moving at a constant speed, the pendulum 204 hangs vertically and thereby causes the electric motor to run at a constant speed. If the rider 203 begins to fall forward, i.e. the center of mass of the rider 203 gets ahead of the wheel 105, then the handlebar 102 is moved forward in relation to the wheel 105. As the handlebar 102 moves forward, the hanging pendulum 104 causes the control knob 201 to rotate such that it speeds up the electric motor to bring the wheel 105 forward under the center of mass of the rider 203 and thereby automatically restores fore-aft balance. If the rider 203 begins to fall backwards, the hanging pendulum 104 causes the control knob 201 to rotate to slow the electric motor to bring the wheel 105 back under the center of mass of the rider 203. The rider 203 may accelerate or decelerate by simply either pushing the handlebar 102 forward or pulling it backward respectively. A damping system may also be incorporated into such a control system 200 in order to prevent the pendulum 204 from continuously oscillating back and forth in a swinging motion, which would cause the unicycle to accelerate and decelerate in succession undesirably.

Figure 4:
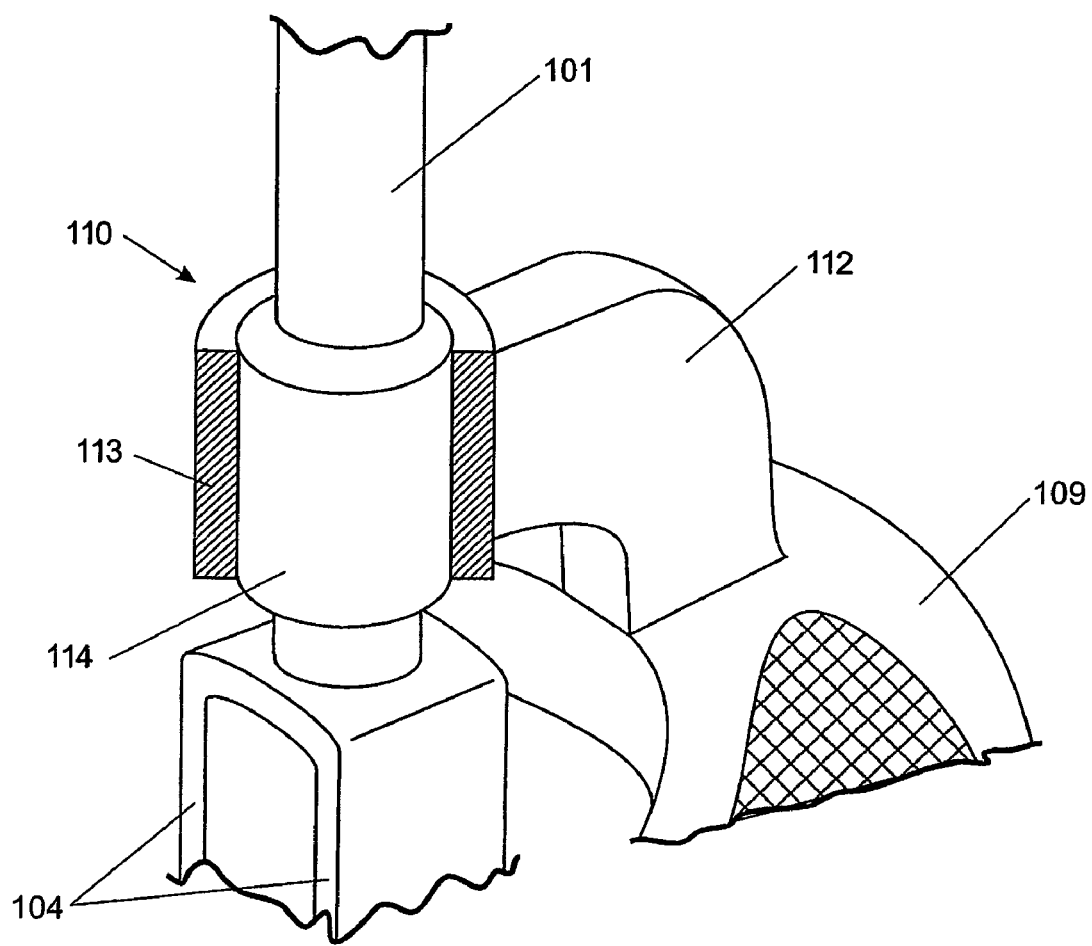
FIG. 4 shows a perspective view of a partially exposed self-biased pivotal connection which mounts the standing platform to a pillar of the first preferred form powered unicycle.

Referring to FIG. 4, the standing platform 109 has a central support member 112 which carries a cylindrical sleeve 113. The sleeve 113 surrounds and is fixed to a bush 114, formed from a resilient flexible material such as rubber or urethane, located about and fixed to a lower portion of the pillar 101. The sleeve 113 and bush 114 form a pivotal connection 110 which allows the standing platform 109 to pivot about the pillar 101 when a rider is steering the wheel 105 by the handlebar 102, but which is biased such that the standing platform 109 is urged toward a central position relative to the wheel 105. The resilient nature of the bush 114 allows flexing pivotal movement of the standing platform 109 relative to the pillar 101 but maintains a bias on that pivotal movement to urge the standing platform 109 toward a central resting position relative to the wheel 105. It will be appreciated that the pivotal connection 110 may be adjusted to provide varying degrees of bias. For example, the pivotal connection 110 may be configured to be very stiff or very loose if desired.

Figure 5:
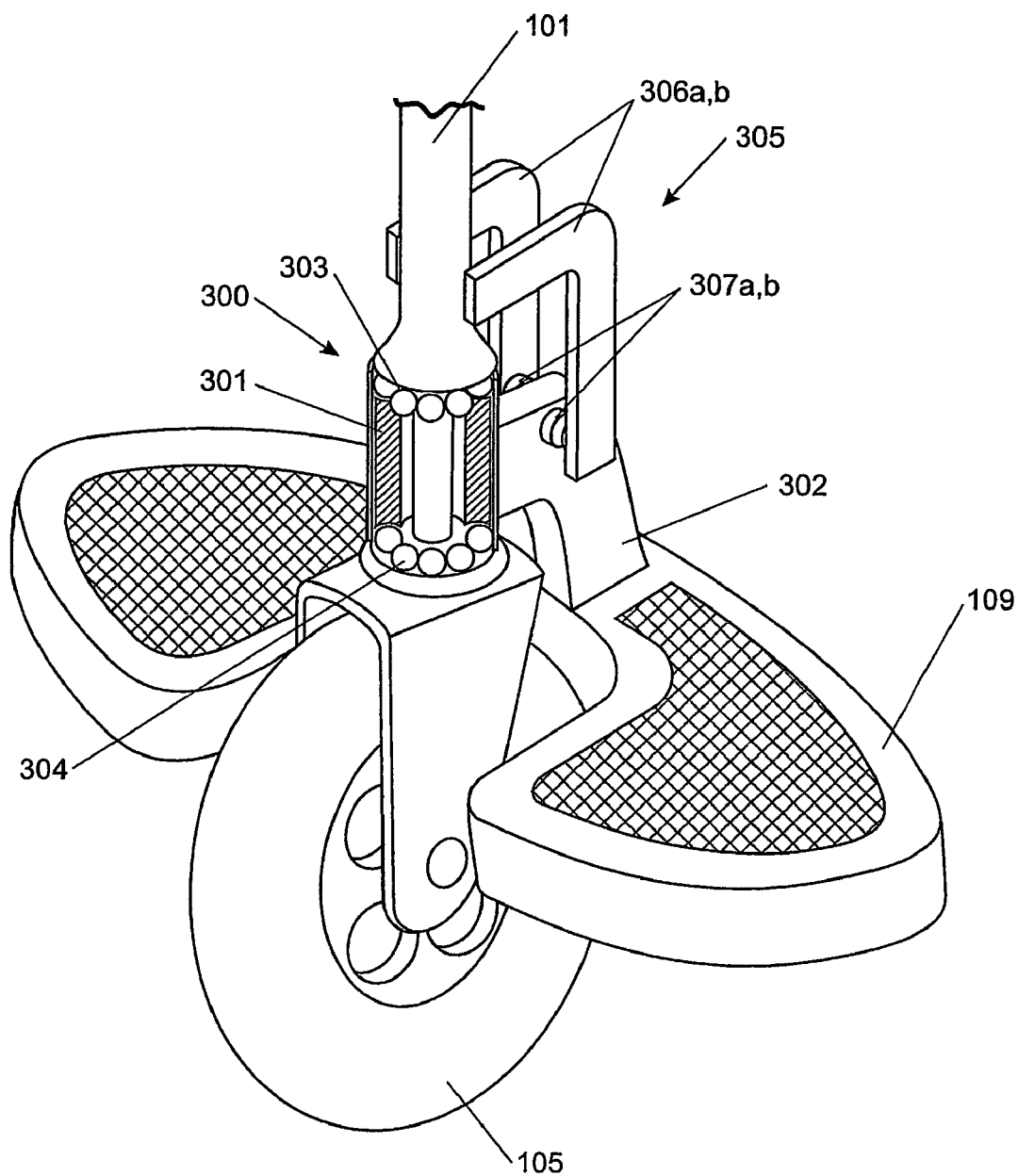
FIG. 5 shows a perspective view of an alternative partially exposed pivotal connection for mounting the standing platform to the pillar of the first preferred form powered unicycle and its associated spring mechanism.

An alternative pivotal connection 300 for mounting the standing platform 109 to the pillar 101 is shown in FIG. 5. Pivotal connection 300 also utilises a sleeve 301, extending from a central member 302 of the standing platform 109, which surrounds a portion of the pillar 101, however, pivotal motion of the standing platform 109 relative to the pillar 101 is enabled by upper 303 and lower 304 sets of ball bearings. Preferably, an associated biasing mechanism, such as a spring mechanism 305, is provided with alternative pivotal connection 300 to urge the standing platform 109 toward a central position relative to the wheel 105.

Figure 6:
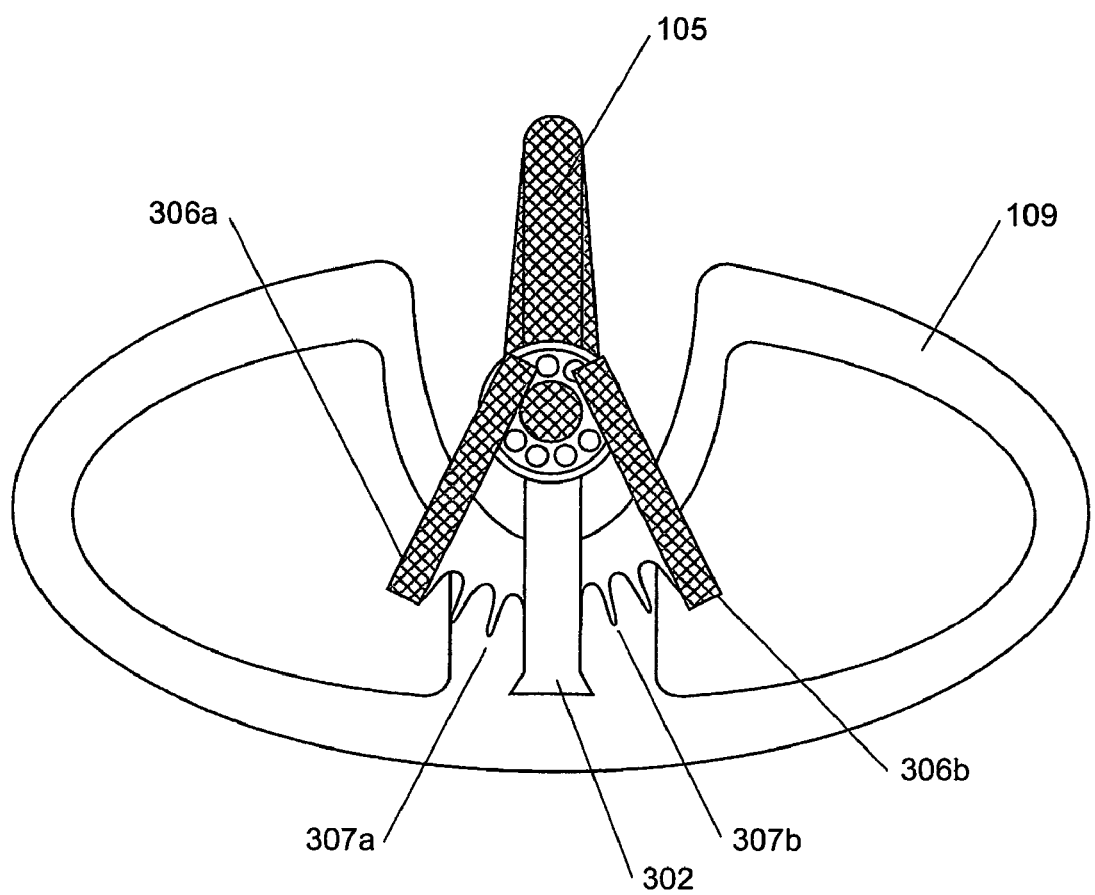
FIG. 6 is a partial plan view of the alternative pivotal connection and its associated spring mechanism of FIG. 5.

The preferred form spring mechanism 305 includes two bent arms 306a, 306b being rigidly attached to opposite sides of the pillar 101 at one end, while the other ends are coupled to the central member 302 of the standing platform 109 by opposed springs 307a, 307b. Referring to FIG. 6, the standing platform 109 is shown in a central position relative to the wheel 105 with springs 307a, 307b in rest positions. If the rider turns the wheel 105 to the left for example, via operation of the handlebars 102, arm 306a will be brought toward central member 302 of the standing platform thereby compressing spring 307a, while arm 306b will move away from central member 302 thereby expanding spring 307b. If the wheel 105 is turned to the right, the opposite will happen. As the springs 307a, 307b are biased toward returning to their rest positions, i.e. where they are not compressed or expanded, they will urge the standing platform 109 toward its central position relative to the wheel 105. It will be appreciated that springs of varying stiffness may be utilised depending on the degree of bias required. Further, in alternative forms of the spring mechanism, the springs could be resilient blocks or members.

In an alternative arrangement of the spring mechanism 305, one end of each bent arm 306a, 306b may be fixed to the central member 302 of the standing platform 109, while the other ends are coupled to the pillar 101 by opposed springs which operate to urge the standing platform into a central position relative to the wheel.

Various other biased pivotal connections may be utilised to mount the standing platform to the pillar of the unicycle. For example, other pivotal connections may be arranged with a gravitational bias which urges the standing platform toward a central position relative to the wheel. In order to provide a gravitational bias, the pivotal connection would be angled backward relative to vertical so that the standing platform, especially under the weight of the rider, tends to hang aft in a central position relative to the wheel. With such an angled pivotal connection, the weight of the standing platform and rider bias the standing platform toward a central position relative to the wheel.

It will be appreciated that the standing platform does not have to be biased toward a central position relative to the wheel. For example, the standing platform may be mounted to the pillar utilising a pivotal connection which is not in anyway biased or which does not have an associated biasing mechanism, thereby allowing the standing platform to freely pivot about the pillar without bias.

Reverting to FIG. 2, operation of the unicycle 100 by a rider will now be described. In the preferred form, the control system of the unicycle 100 disables the electric motor 107 whenever the unicycle is traveling below a predetermined lower speed limit, thereby allowing the wheel 105 to freely rotate. This enables a rider to mount the unicycle and accelerate it from rest with a push-off and ensures that the unicycle is at least at operating speed before its control system is required to maintain fore-aft balance. Once the control system detects that the unicycle 100 is traveling over the predetermined lower speed limit, via a speedometer associated with the electric motor 107 or wheel 105, it starts the motor and operates it to accelerate or decelerate the wheel 105 to automatically maintain fore-aft balance for the rider. The rider, at the same time, steers the wheel 105 to the left or right by via operation of the handlebar 102 to maintain lateral balance. Should the rider want to go faster they need to only lean the pillar 101 forward via the handle bar 102 and should they want to slow down they simply lean the pillar 101 back.

Figure 1:
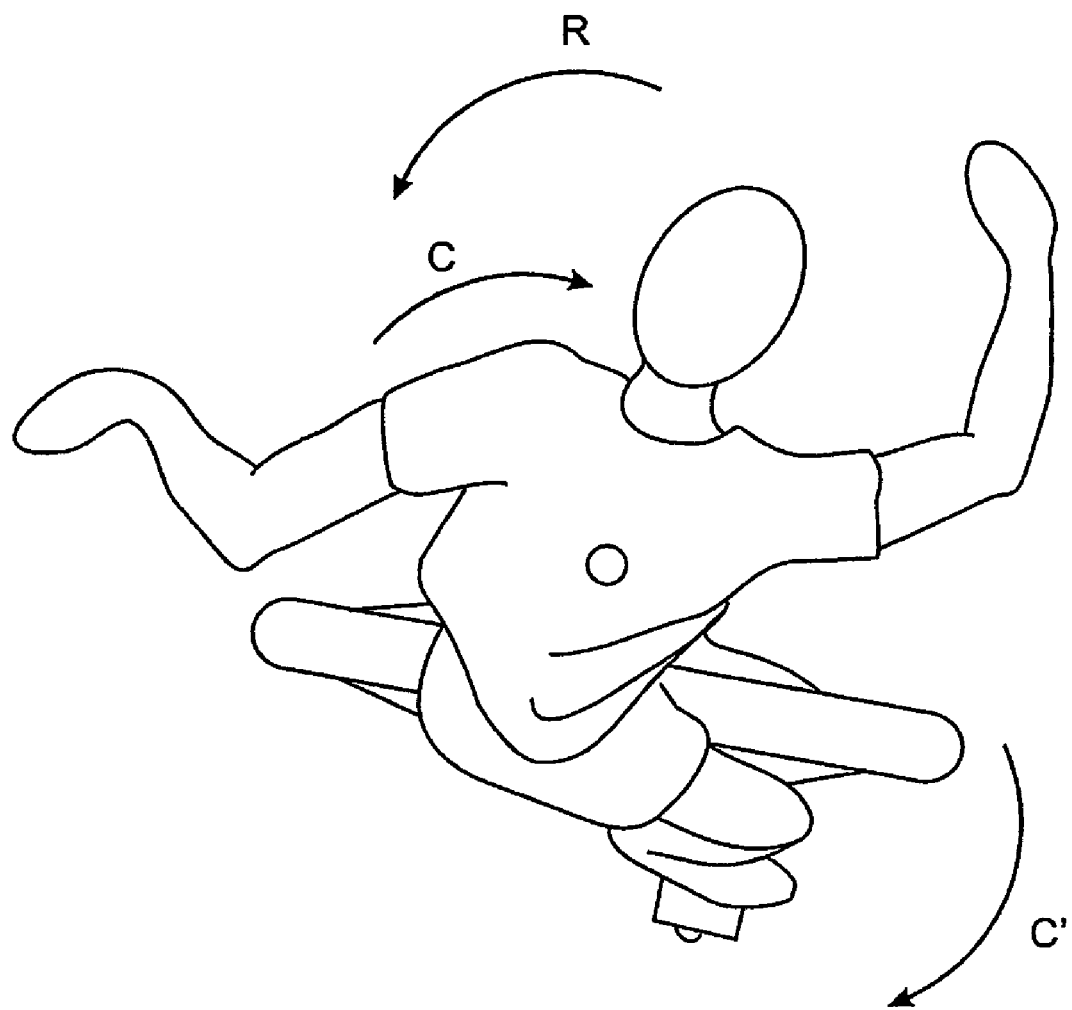
FIG. 1 is a plan view of a rider steering a pedal-operated unicycle by body twisting, as is known in the prior art.
Figure 7:
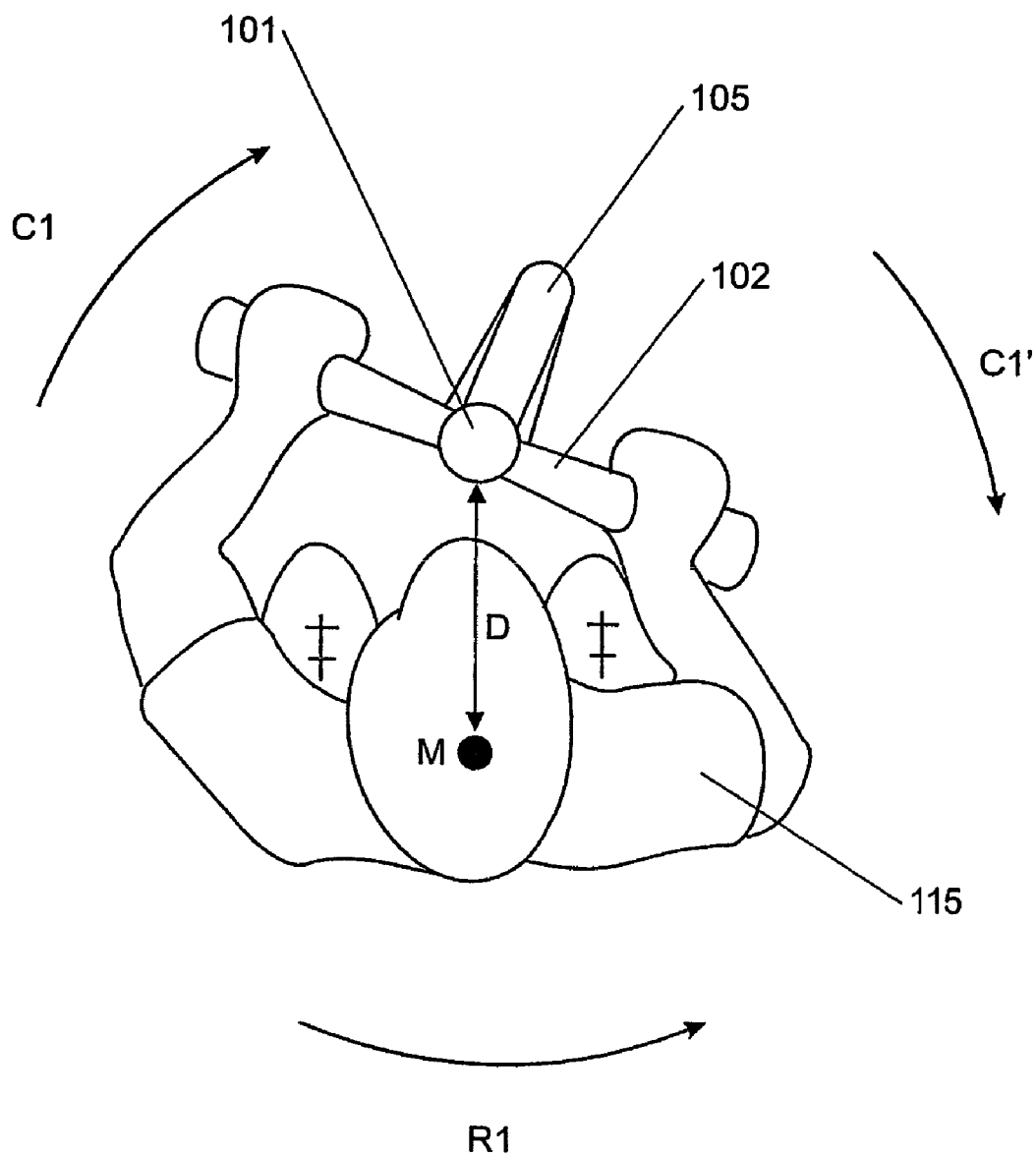
FIG. 7 is a schematic plan view of a rider steering the first preferred form powered unicycle to maintain lateral balance.

Referring to FIG. 7, the dynamics of the rider maintaining lateral balance on the unicycle 100 by steering the wheel 105 will now be explained. To steer the wheel 105, the rider 115 must apply a steering couple c1 & c1' to the handlebar 102 in the desired direction which must be reacted by a reacting moment R1. Because the standing platform, which supports the rider, is pivotable about the pillar 101 and the center of mass M of the rider 115 is offset from the pillar 101 by small distance D, the required reacting moment R1 is provided by mass M×distance D. Therefore, the rider 115 may easily make the steering movements required to maintain lateral balance without the need for body twisting similar to that shown in FIG. 1.

Figure 8:
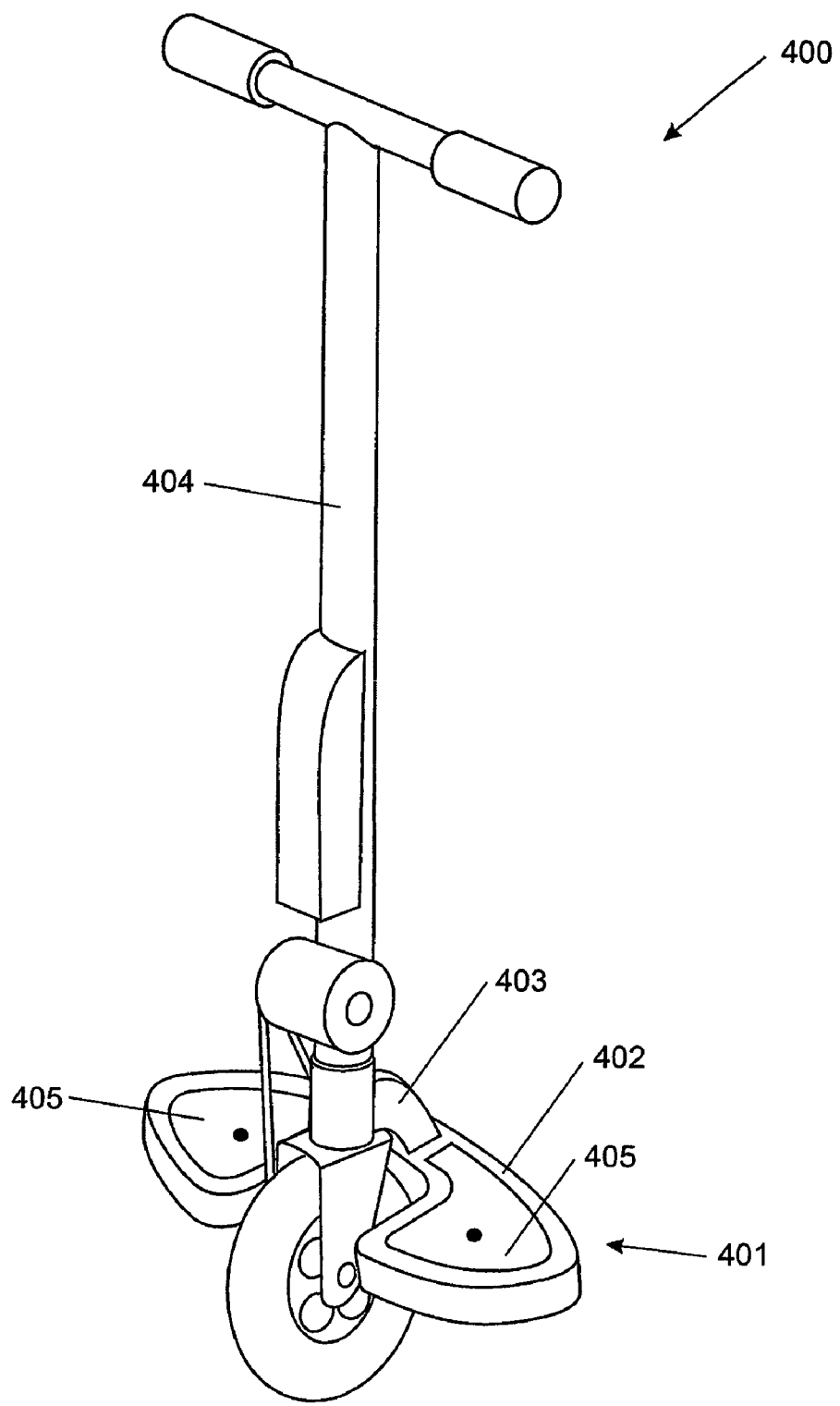
FIG. 8 shows a perspective view of a second preferred form powered unicycle having a rigidly attached standing platform with pivotal foot pads.

Referring to FIG. 8, a second preferred form powered unicycle 400 is shown. This unicycle 400 is similar to the first preferred form unicycle 100, however it has an alternative standing platform 401 arrangement. In particular, the standing platform 401 includes a base portion 402 having a central member 403 which is rigidly attached to the pillar 404 of the unicycle 400. The base portion 402 of the standing platform 401 supports two pivotal foot pads 405 upon which a rider may place their feet. The pivotal foot pads 405 are arranged to pivot or turn relative to the base portion 402 of the standing platform 401. As the rider steers the wheel of the unicycle via the handlebar, the base portion 402 of the standing platform 401 may turn or pivot beneath the pivotal foot pads 405 supporting the rider's feet. Therefore, the pivotal foot pads 405 enable a rider to steer the unicycle, to thereby maintain lateral balance, without the need for body twisting similar to that shown in FIG. 1. It will be appreciated that the pivotal foot pads 405 may also each have an associated biasing means which urges them toward a central rest position relative to the wheel.

Figure 9:
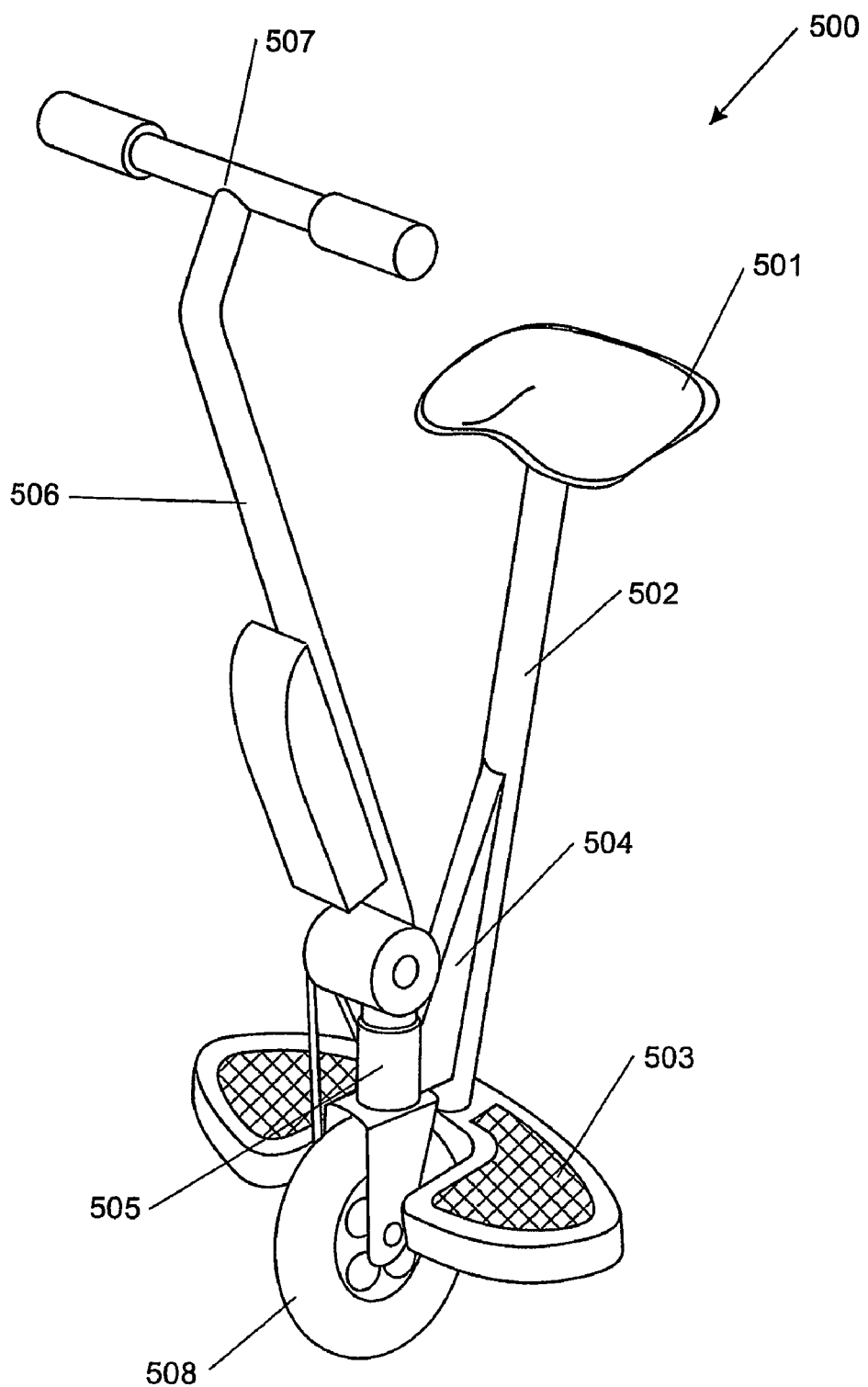
FIG. 9 shows a perspective view of a third preferred form powered unicycle which has a seat.

Referring to FIG. 9, a third preferred form powered unicycle 500 having a rider-support with a seat 501 is shown. The powered unicycle 500 operates in a similar manner as the first and second form unicycles described, although the rider is able to sit rather than having to stand. The rider-support includes a seat post 502 provided with a seat 501 at one end and a foot platform 503 at the other end. The seat post 502 has a central support 504 which is fixed to a pivotal connection 505 located about the pillar 506 of the unicycle. The pillar 506 and seat post 502 are angled relative to each other in order to locate the center of mass of the rider over the wheel to enhance stability. The pivotal connection 505 allows the rider-support, with seat 501 and foot platform 503, to pivot relative to the pillar 506 when the rider operates the handlebar 507 to steer the wheel 508 to maintain lateral balance. The pivotal connection 505 may be in the form of those shown in FIGS. 4-6 and may be spring or gravitationally biased to urge the rider-support toward a central position relative to the wheel. Alternatively, the pivotal connection 505 may not be biased at all and may allow the rider-support to freely pivot relative to the pillar 506 as the rider steers the unicycle.

In operation, a rider sits on the seat 501 with their feet resting on the foot platform 503. As with the first and second form powered unicycles, the control system automatically maintains fore-aft balance and the rider can control speed by leaning forward or backward as required. To maintain lateral balance, the rider simply operates the handlebar 507 to steer the wheel 508 as required. If the rider desires, they may also choose to stand on the foot platform 503 while riding the unicycle.

It will be appreciated that the foot platform 503 is not necessary to the rider-support and that the rider may simply hang their legs from the seat 501 if a foot platform 503 is not provided in alternative configurations of the rider-support. In another arrangement, the seat post may be rigidly coupled to the pillar of the unicycle and the seat may be configured to pivot, relative to the wheel, on top of the seat post. In addition, the seat may be biased toward a central position relative to the wheel.

The preferred forms of the powered unicycle have rider-supports which are pivotable relative to the wheel. As discussed, the rider-supports may be, for example, a standing platform which is pivotally mounted to the pillar, pivotal foot pads, or a seat which is pivotally mounted to or pivotal relative to the pillar. The pivotal rider-supports allow a rider to pivot the wheel relative to their body and therefore allow the rider to steer the wheel via a handlebar, in order to maintain lateral balance, without the need for body twisting similar to that shown in FIG. 1. Because the powered unicycle automatically maintains fore-aft balance, the rider only needs to maintain lateral balance by steering the wheel by a handlebar, which is an intuitive skill and does not involve a great deal of body manipulation.

The foregoing description of the invention includes preferred forms thereof. Modifications may be made thereto without departing from the scope of the invention as defined in the accompanying claims.

I claim:

1. A powered unicycle including:
   a wheel driven by a motor;
   a control system arranged to automatically maintain the fore-aft balance of the unicycle via operation of the motor;
   a handlebar, coupled to the wheel by a pillar, which is operable to steer the wheel; and
   a rider-support which supports a rider, and which is pivotally mounted about an axis which is at least approximately vertical in use of the unicycle.

2. A powered unicycle according to claim 1, wherein the rider-support is pivotally mounted to the pillar by a pivotal connection.

3. A powered unicycle according to claim 2, wherein the pivotal connection is configured to resiliently urge the rider support toward a central position relative to the wheel.

4. A powered unicycle according to claim 3, wherein the pivotal connection includes a bush formed from resilient material located about a lower portion of the pillar and a sleeve coupled to the rider-support which surrounds the bush.

5. A powered unicycle according to claim 2, wherein the pivotal connection includes a spring mechanism arranged to urge the rider-support toward a central position relative to the wheel.

6. A powered unicycle according to claim 5, wherein the spring mechanism includes two arms fixed relative to either the pillar or the rider-support and against which springs operate to urge the rider-support toward said central position.

7. A powered unicycle according to claim 1, wherein the rider-support is a standing platform upon which the rider may stand.

8. A powered unicycle according to claim 1, wherein the rider-support includes a seat upon which the rider may sit.

9. A powered unicycle according to claim 8, wherein the rider-support further includes a foot platform upon which the rider may place their feet while sitting on the seat.

10. A powered unicycle according to claim 1, wherein the rider-support is a seat, mounted to the pillar by a seat post, the seat being pivotal upon the seat post.

11. A powered unicycle according to claim 1, wherein unicycle includes two rider-supports, each being a foot pad pivotally mounted on a standing platform which is rigidly mounted to the pillar.

12. A powered unicycle according to claim 11, wherein the foot pads are biased toward a central position relative to the wheel.

13. A powered unicycle according to claim 1, wherein the control system has one or more associated sensors arranged to detect whether the pillar and wheel are aligned with the local gravitational and inertial force field.

14. A powered unicycle according to claim 13, wherein the control system is arranged to operate the motor to accelerate the wheel when it is detected as behind the field and to decelerate the wheel when it is detected as ahead of the field, to automatically maintain the fore-aft balance of the unicycle.

15. A powered unicycle including:
    a wheel driven by a motor;
    a control system arranged to automatically maintain the fore-aft balance of the unicycle via operation of the motor;
    a handlebar, coupled to the wheel by a pillar, which is operable to steer the wheel; and
    a standing platform, upon which a rider may stand, which is pivotally mounted about an axis which is at least approximately vertical in use of the unicycle.

16. A powered unicycle according to claim 15, wherein the standing platform is pivotally mounted to the pillar by a pivotal connection.

17. A powered unicycle according to claim 16, wherein the pivotal connection is configured to resiliently urge the standing platform toward a central position relative to the wheel.

18. A powered unicycle according to claim 16, wherein the pivotal connection includes a spring mechanism arranged to urge the standing platform toward a central position relative to the wheel.

19. A powered unicycle including:
    a wheel driven by a motor;
    a control system arranged to automatically maintain the fore-aft balance of the unicycle via operation of the motor;
    a handlebar, coupled to the wheel by a pillar, which is operable to steer the wheel;
    a platform fixed to the pillar; and
    two foot pads each pivotally mounted to the platform about an axis which is at least approximately vertical in use of the unicycle, upon which the rider may stand.

20. A powered unicycle according to claim 19, wherein the foot pads are biased toward a central position relative to the wheel.

* * * * *